United States Patent
Symington

(10) Patent No.: US 8,495,042 B2
(45) Date of Patent: Jul. 23, 2013

(54) INFORMATION EXTRACTION APPARATUS AND METHODS

(75) Inventor: Beatrice Symington, Edinburgh (GB)

(73) Assignee: ITI Scotland Limited, Glasgow (GB)

(*) Notice: Subject to any disclaimer, the term of this patent is extended or adjusted under 35 U.S.C. 154(b) by 0 days.

(21) Appl. No.: 12/682,648

(22) PCT Filed: Oct. 10, 2008

(86) PCT No.: PCT/GB2008/050933
§ 371 (c)(1), (2), (4) Date: Nov. 16, 2010

(87) PCT Pub. No.: WO2009/047570
PCT Pub. Date: Apr. 16, 2009

(65) Prior Publication Data
US 2011/0099184 A1    Apr. 28, 2011

(30) Foreign Application Priority Data

Oct. 10, 2007 (GB) .................................. 0719842.7
Feb. 20, 2008 (GB) .................................. 0803078.5

(51) Int. Cl.
*G06F 17/30* (2006.01)

(52) U.S. Cl.
USPC .............................. 707/702; 706/45; 706/46

(58) Field of Classification Search
USPC ..................... 707/600–602, 45–46
See application file for complete search history.

(56) References Cited

U.S. PATENT DOCUMENTS

| | | | |
|---|---|---|---|
| 7,136,710 B1* | 11/2006 | Hoffberg et al. | 700/83 |
| 7,231,381 B2* | 6/2007 | Li et al. | 707/766 |
| 2005/0108001 A1* | 5/2005 | Aarskog | 704/10 |
| 2005/0131649 A1 | 6/2005 | Larsen et al. | |
| 2006/0053170 A1 | 3/2006 | Hill et al. | |
| 2006/0074832 A1* | 4/2006 | Gardner et al. | 706/45 |
| 2006/0074833 A1* | 4/2006 | Gardner et al. | 706/45 |
| 2006/0074836 A1* | 4/2006 | Gardner et al. | 706/60 |
| 2006/0288285 A1* | 12/2006 | Lai et al. | 715/708 |
| 2007/0047816 A1* | 3/2007 | Graham et al. | 382/181 |
| 2007/0255512 A1* | 11/2007 | Delenstarr et al. | 702/35 |
| 2008/0243905 A1* | 10/2008 | Pavlov et al. | 707/102 |
| 2008/0313130 A1* | 12/2008 | Hammond et al. | 707/2 |
| 2009/0154792 A1* | 6/2009 | Sun et al. | 382/154 |

OTHER PUBLICATIONS

International Search Report for PCT/GB2008/050933, mailed Feb. 23, 2009.
Written Opinion of the International Searching Authority for PCT/GB2008/050933, mailed Feb. 23, 2009.
Japanese Office Action dated Apr. 16, 2013, issued in corresponding Japanese Application No. 2010-528490, 6 pages.
Shinnou, "Detection of Japanese Homophone Errors by a Decision List Including a Written Word as a Default Evidence" IPSJ Journal, vol. 41, No. 4, Japan, Information Processing Society of Japan, Apr. 2000, pp. 1046-1053, English Abstract.

* cited by examiner

*Primary Examiner* — Hanh Thai
(74) *Attorney, Agent, or Firm* — Nixon & Vanderhye PC

(57) ABSTRACT

Automatic information extraction apparatus for extracting data for review by a human curator from digital representations of documents comprising natural language text, the automatic information extraction apparatus having a plurality of selectable operating modes in which the automatic information extraction apparatus is operable to extract different data for review by a human curator. In the different operating modes, the information extraction apparatus may extract data with a different balance between recall and precision.

24 Claims, 12 Drawing Sheets

Glycogen synthase kinase3 beta phosphorylates serine 33 of p53 and activates p53's transcriptional activity BACKGROUND: The p53 protein is activated by genotoxic stress, oncogene expression and during senescence, p53 transcriptionally activates genes involved in growth arrest and apoptosis. p53 activation is regulated by post-translational modification, including phosphorylation of the N-terminal transactivation domain. Here, we have examined how Glycogen Synthase Kinase (GSK3), a protein kinase involved in tumorigenesis, differentiation and apoptosis, phosphorylates and regulates p53. RESULTS: The 2 isoforms of GSK3, GSK3alpha and GSK3beta, phosphorylate the sequence Ser-X-X-X-Ser(P) when the C-terminal serine residue is already phosphorylated. Several p53 kinases were examined for their ability to create GSK3 phosphorylation sites on the p53 protein. Our results demonstrate that phosphorylation of serine 37 of p53 by DNA-PK creates a site for GSK3beta phosphorylation at serine 33 in vitro. GSK3alpha did not phosphorylate p53 under any condition. GSK3beta increased the transcriptional activity of the p53 protein in vivo. Mutation of either serine 33 or serine 37 of p53 to alanine blocked the ability of GSK3beta to regulate p53 transcriptional activity. GSK3beta is therefore able to regulate p53 function in vivo. p53's transcriptional activity is commonly increased by DNA damage. However, GSK3beta kinase activity was inhibited in response to DNA damage, suggesting that GSK3beta regulation of p53 is not involved in the p53-DNA damage response. CONCLUSIONS: GSK3beta can regulate p53's transcriptional activity by phosphorylating serine 33. However, GSK3beta does not appear to be part of the p53-DNA damage response pathway. Instead, GSK3beta may provide the link between p53 and non-DNA damage mechanisms for p53 activation.

FIG. 6

```xml
<?xml version="1.0" encoding="UTF-8" ?>
<document>
<meta>
<attr name="abstract_from">pubmed</attr>
<attr name="abstract_or_fulltext">abstract</attr>
<attr name="pubmed_central_id">35361</attr>
<attr name="search_parameters">Apoptosis, ubiquitination, Phosphorylation, Cell cycle</attr>
<attr name="url">http://www.ncbi.nlm.nih.gov/entrez/query.fcgi?term=35361&search=Find+Articles&db=pmc&cmd=search&pmfilter_Fulltext=on&pmfilter_Relevance=on</attr>
</meta>
<text>
<title>Glycogen synthase kinase3 beta phosphorylates serine 33 of p53 and activates p53's transcriptional activity</title>
<body>BACKGROUND: The p53 protein is activated by genotoxic stress, oncogene expression and during senescence, p53 transcriptionally activates genes involved in growth arrest and apoptosis. p53 activation is regulated by post-translational modification, including phosphorylation of the N-terminal transactivation domain. Here, we have examined how Glycogen Synthase Kinase (GSK3), a protein kinase involved in tumorigenesis, differentiation and apoptosis, phosphorylates and regulates p53. RESULTS: The 2 isoforms of GSK3, GSK3alpha and GSK3beta, phosphorylate the sequence Ser-X-X-X-Ser(P) when the C-terminal serine residue is already phosphorylated. Several p53 kinases were examined for their ability to create GSK3 phosphorylation sites on the p53 protein. Our results demonstrate that phosphorylation of serine 37 of p53 by DNA-PK creates a site for GSK3beta phosphorylation at serine 33 in vitro. GSK3alpha did not phosphorylate p53 under any condition. GSK3beta increased the transcriptional activity of the p53 protein in vivo. Mutation of either serine 33 or serine 37 of p53 to alanine blocked the ability of GSK3beta to regulate p53 transcriptional activity. GSK3beta is therefore able to regulate p53 function in vivo. p53's transcriptional activity is commonly increased by DNA damage. However, GSK3beta kinase activity was inhibited in response to DNA damage, suggesting that GSK3beta regulation of p53 is not involved in the p53-DNA damage response. CONCLUSIONS: GSK3beta can regulate p53's transcriptional activity by phosphorylating serine 33. However, GSK3beta does not appear to be part of the p53-DNA damage response pathway. Instead, GSK3beta may provide the link between p53 and non-DNA damage mechanisms for p53 activation.</body>
</text>
</document>
```

FIG. 7

```xml
<?xml version="1.0" encoding="UTF-8"?>
<!DOCTYPE document PUBLIC "-//LTG-Cognia-ITI//DTD IE OUTPUT V1//EN" "ie-output.dtd">
<document><meta><attr name="abstract_from">pubmed</attr><attr
name="abstract_or_fulltext">abstract</attr><attr
name="pubmed_central_id">35361</attr><attr
name="search_parameters">Apoptosis, ubiquitination, Phosphorylation,
Cell cycle</attr><attr
name="url">http://www.ncbi.nlm.nih.gov/entrez/query.fcgi?term=35361&
search=Find+Articles&db=pmc&cmd=search&pmfilter_Fulltext=on&
amp;pmfilter_Relevance=on</attr><attr
name="tokeniser_version">20050908</attr></meta><text><title>
<s><ent id="e1" type="protein" conf="100"
norm="http://www.cognia.com/txm/biomedical/#protein_P00493973"><w>Glycog
en</w> <w>synthase</w> <w>kinase3</w> <w>beta</w></ent>
<w>phosphorylates</w> <w>serine</w> <w>33</w> <w>of</w> <ent id="e2"
type="protein" conf="100"
norm="http://www.cognia.com/txm/biomedical/#protein_P00502885"><w>p53</w
></ent> <w>and</w> <w>activates</w> <ent id="e3" type="protein"
conf="100"
norm="http://www.cognia.com/txm/biomedical/#protein_P00502885"><w>p53</w
></ent><w>'s</w> <w>transcriptional</w> <w>activity</w></s>
</title><body>
<p><s><w>BACKGROUND</w><w>:</w> <w>The</w> <ent id="e4" type="protein"
conf="100"
norm="http://www.cognia.com/txm/biomedical/#protein_P00502885"><w>p53</w
></ent> <w>protein</w> <w>is</w> <w>activated</w> <w>by</w>
<w>genotoxic</w> <w>stress</w><w>,</w> <w>oncogene</w> <w>expression</w>
<w>and</w> <w>during</w> <w>senescence</w><w>,</w> <ent id="e5"
type="protein" conf="100"
norm="http://www.cognia.com/txm/biomedical/#protein_P00502885"><w>p53</w
></ent> <w>transcriptionally</w> <w>activates</w> <w>genes</w>
<w>involved</w> <w>in</w> <w>growth</w> <w>arrest</w> <w>and</w>
<w>apoptosis</w><w>.</w> <ent id="e6" type="protein" conf="100"
norm="http://www.cognia.com/txm/biomedical/#protein_P00502885"><w>p53</w
></ent> <w>activation</w> <w>is</w> <w>regulated</w> <w>by</w>
<w>post</w><w>-</w><w>translational</w> <w>modification</w><w>,</w>
<w>including</w> <w>phosphorylation</w> <w>of</w> <w>the</w>
<w>N</w><w>-</w><w>terminal</w> <w>transactivation</w>
<w>domain</w><w>.</w></s> <s><w>Here</w><w>,</w> <w>we</w> <w>have</w>
<w>examined</w> <w>how</w> <ent id="e7" type="protein" conf="100"
norm="http://www.cognia.com/txm/biomedical/#protein_P00696969"><w>Glycog
en</w> <w>Synthase</w> <w>Kinase</w></ent> <w>(</w><ent id="e8"
type="protein" conf="25.000"
norm="http://www.cognia.com/txm/biomedical/#protein_P00532669"><w>GSK3</
w></ent><w>)</w><w>,</w> <w>a</w> <w>protein</w> <w>kinase</w>
<w>involved</w> <w>in</w> <w>tumorigenesis</w><w>,</w>
<w>differentiation</w> <w>and</w> <w>apoptosis</w><w>,</w>
<w>phosphorylates</w> <w>and</w> <w>regulates</w> <ent id="e9"
type="protein" conf="100"
norm="http://www.cognia.com/txm/biomedical/#protein_P00502885"><w>p53</w
></ent><w>.</w></s> <s><w>RESULTS</w><w>:</w> <w>The</w> <w>2</w>
<w>isoforms</w> <w>of</w> <ent id="e10" type="protein" conf="25.000"
norm="http://www.cognia.com/txm/biomedical/#protein_P00532669"><w>GSK3</
w></ent><w>,</w> <ent id="e11" type="protein" conf="0"
norm="CD"><w>GSK3alpha</w></ent> <w>and</w> <ent id="e12" type="protein"
conf="100"
norm="http://www.cognia.com/txm/biomedical/#protein_P00733182"><w>GSK3be
ta</w></ent><w>,</w> <w>phosphorylate</w> <w>the</w> <w>sequence</w>
<w>Ser</w><w>-</w><w>X</w><w>-</w><w>X</w><w>-</w><w>X</w><w>-
</w><w>Ser(P)</w> <w>when</w> <w>the</w> <w>C</w><w>-</w><w>terminal</w>
<w>serine</w> <w>residue</w> <w>is</w> <w>already</w>
```

FIG. 8A

```
<w>phosphorylated</w><w>.</w></s> <s><w>Several</w> <ent id="e13"
type="protein" conf="100"
norm="http://www.cognia.com/txm/biomedical/#protein_P00502885"><w>p53</w
></ent> <w>kinases</w> <w>were</w> <w>examined</w> <w>for</w>
<w>their</w> <w>ability</w> <w>to</w> <w>create</w> <ent id="e14"
type="protein" conf="25.000"
norm="http://www.cognia.com/txm/biomedical/#protein_P00532669"><w>GSK3</
w></ent> <w>phosphorylation</w> <w>sites</w> <w>on</w> <w>the</w> <ent
id="e15" type="protein" conf="100"
norm="http://www.cognia.com/txm/biomedical/#protein_P00502885"><w>p53</w
></ent> <w>protein</w><w>.</w></s> <s><w>Our</w> <w>results</w>
<w>demonstrate</w> <w>that</w> <w>phosphorylation</w> <w>of</w>
<w>serine</w> <w>37</w> <w>of</w> <ent id="e16" type="protein"
conf="100"
norm="http://www.cognia.com/txm/biomedical/#protein_P00502885"><w>p53</w
></ent> <w>by</w> <ent id="e17" type="protein" conf="100"
norm="http://www.cognia.com/txm/biomedical/#protein_P00519047"><w>DNA</w
><w>-</w><w>PK</w></ent> <w>creates</w> <w>a</w> <w>site</w> <w>for</w>
<ent id="e18" type="protein" conf="100"
norm="http://www.cognia.com/txm/biomedical/#protein_P00733182"><w>GSK3be
ta</w></ent> <w>phosphorylation</w> <w>at</w> <w>serine</w> <w>33</w>
<w>in</w> <w>vitro</w><w>.</w></s> <s><ent id="e19" type="protein"
conf="0" norm="CD"><w>GSK3alpha</w></ent> <w>did</w> <w>not</w>
<w>phosphorylate</w> <ent id="e20" type="protein" conf="100"
norm="http://www.cognia.com/txm/biomedical/#protein_P00502885"><w>p53</w
></ent> <w>under</w> <w>any</w> <w>condition</w><w>.</w></s> <s><ent
id="e21" type="protein" conf="100"
norm="http://www.cognia.com/txm/biomedical/#protein_P00733182"><w>GSK3be
ta</w></ent> <w>increased</w> <w>the</w> <w>transcriptional</w>
<w>activity</w> <w>of</w> <w>the</w> <ent id="e22" type="protein"
conf="100"
norm="http://www.cognia.com/txm/biomedical/#protein_P00502885"><w>p53</w
></ent> <w>protein</w> <w>in</w> <w>vivo</w><w>.</w></s>
<s><w>Mutation</w> <w>of</w> <w>either</w> <w>serine</w> <w>33</w>
<w>or</w> <w>serine</w> <w>37</w> <w>of</w> <ent id="e23" type="protein"
conf="100"
norm="http://www.cognia.com/txm/biomedical/#protein_P00502885"><w>p53</w
></ent> <w>to</w> <w>alanine</w> <w>blocked</w> <w>the</w>
<w>ability</w> <w>of</w> <ent id="e24" type="protein" conf="100"
norm="http://www.cognia.com/txm/biomedical/#protein_P00733182"><w>GSK3be
ta</w></ent> <w>to</w> <w>regulate</w> <ent id="e25" type="protein"
conf="100"
norm="http://www.cognia.com/txm/biomedical/#protein_P00502885"><w>p53</w
></ent> <w>transcriptional</w> <w>activity</w><w>.</w></s> <s><ent
id="e26" type="protein" conf="100"
norm="http://www.cognia.com/txm/biomedical/#protein_P00733182"><w>GSK3be
ta</w></ent> <w>is</w> <w>therefore</w> <w>able</w> <w>to</w>
<w>regulate</w> <ent id="e27" type="protein" conf="100"
norm="http://www.cognia.com/txm/biomedical/#protein_P00502885"><w>p53</w
></ent> <w>function</w> <w>in</w> <w>vivo</w><w>.</w> <ent id="e28"
type="protein" conf="100"
norm="http://www.cognia.com/txm/biomedical/#protein_P00502885"><w>p53</w
></ent><w>'s</w> <w>transcriptional</w> <w>activity</w> <w>is</w>
<w>commonly</w> <w>increased</w> <w>by</w> <w>DNA</w>
<w>damage</w><w>.</w></s> <s><w>However</w><w>,</w> <ent id="e29"
type="protein" conf="100"
norm="http://www.cognia.com/txm/biomedical/#protein_P00733182"><w>GSK3be
ta</w></ent> <w>kinase</w> <w>activity</w> <w>was</w> <w>inhibited</w>
<w>in</w> <w>response</w> <w>to</w> <w>DNA</w> <w>damage</w><w>,</w>
<w>suggesting</w> <w>that</w> <ent id="e30" type="protein" conf="100"
norm="http://www.cognia.com/txm/biomedical/#protein_P00733182"><w>GSK3be
ta</w></ent> <w>regulation</w> <w>of</w> <ent id="e31" type="protein"
conf="100"
```

FIG. 8B

```
norm="http://www.cognia.com/txm/biomedical/#protein_P00502885"><w>p53</w
></ent> <w>is</w> <w>not</w> <w>involved</w> <w>in</w> <w>the</w> <ent
id="e32" type="protein" conf="100"
norm="http://www.cognia.com/txm/biomedical/#protein_P00502885"><w>p53</w
></ent><w>-</w><w>DNA</w> <w>damage</w> <w>response</w><w>.</w></s>
<s><w>CONCLUSIONS</w><w>:</w> <ent id="e33" type="protein" conf="100"
norm="http://www.cognia.com/txm/biomedical/#protein_P00733182"><w>GSK3be
ta</w></ent> <w>can</w> <w>regulate</w> <ent id="e34" type="protein"
conf="100"
norm="http://www.cognia.com/txm/biomedical/#protein_P00502885"><w>p53</w
></ent><w>'s</w> <w>transcriptional</w> <w>activity</w> <w>by</w>
<w>phosphorylating</w> <w>serine</w> <w>33</w><w>.</w></s>
<s><w>However</w><w>,</w> <ent id="e35" type="protein" conf="100"
norm="http://www.cognia.com/txm/biomedical/#protein_P00733182"><w>GSK3be
ta</w></ent> <w>does</w> <w>not</w> <w>appear</w> <w>to</w> <w>be</w>
<w>part</w> <w>of</w> <w>the</w> <ent id="e36" type="protein" conf="100"
norm="http://www.cognia.com/txm/biomedical/#protein_P00502885"><w>p53</w
></ent><w>-</w><w>DNA</w> <w>damage</w> <w>response</w>
<w>pathway</w><w>.</w></s> <s><w>Instead</w><w>,</w> <ent id="e37"
type="protein" conf="100"
norm="http://www.cognia.com/txm/biomedical/#protein_P00733182"><w>GSK3be
ta</w></ent> <w>may</w> <w>provide</w> <w>the</w> <w>link</w>
<w>between</w> <ent id="e38" type="protein" conf="100"
norm="http://www.cognia.com/txm/biomedical/#protein_P00502885"><w>p53</w
></ent> <w>and</w> <w>non</w><w>-</w><w>DNA</w> <w>damage</w>
<w>mechanisms</w> <w>for</w> <ent id="e39" type="protein" conf="100"
norm="http://www.cognia.com/txm/biomedical/#protein_P00502885"><w>p53</w
></ent> <w>activation</w><w>.</w></s></p>
</body><relations>
  <relation id="r1" conf="67.741425" norm="P00493973 - P00502885"
type="ppi">
    <argument ref="e1"/>
    <argument ref="e2"/>
  </relation>
  <relation id="r2" conf="42.08819" norm="P00493973 - P00502885"
type="ppi">
    <argument ref="e1"/>
    <argument ref="e3"/>
  </relation>
  <relation id="r3" conf="37.601925" norm="P00502885 - P00502885"
type="ppi">
    <argument ref="e4"/>
    <argument ref="e5"/>
  </relation>
  <relation id="r4" conf="33.473854" norm="P00696969 - P00502885"
type="ppi">
    <argument ref="e7"/>
    <argument ref="e9"/>
  </relation>
  <relation id="r5" conf="25.957853" norm="P00532669 - P00502885"
type="ppi">
    <argument ref="e8"/>
    <argument ref="e9"/>
  </relation>
  <relation id="r6" conf="29.081007" norm="P00532669 - P00502885"
type="ppi">
    <argument ref="e14"/>
    <argument ref="e15"/>
  </relation>
  <relation id="r7" conf="71.28724" norm="P00502885 - P00519047"
type="ppi">
    <argument ref="e16"/>
    <argument ref="e17"/>
  </relation>
```

FIG. 8C

```xml
<relation id="r8" conf="76.76192" norm="P00733182 - P00502885" type="ppi">
  <argument ref="e21"/>
  <argument ref="e22"/>
</relation>
<relation id="r9" conf="26.230299" norm="P00502885 - P00733182" type="ppi">
  <argument ref="e23"/>
  <argument ref="e24"/>
</relation>
<relation id="r10" conf="36.049717" norm="P00733182 - P00502885" type="ppi">
  <argument ref="e24"/>
  <argument ref="e25"/>
</relation>
<relation id="r11" conf="57.14778" norm="P00733182 - P00502885" type="ppi">
  <argument ref="e26"/>
  <argument ref="e27"/>
</relation>
<relation id="r12" conf="27.17637" norm="P00733182 - P00502885" type="ppi">
  <argument ref="e29"/>
  <argument ref="e31"/>
</relation>
<relation id="r13" conf="54.6523" norm="P00733182 - P00502885" type="ppi">
  <argument ref="e30"/>
  <argument ref="e31"/>
</relation>
<relation id="r14" conf="24.181108" norm="P00733182 - P00502885" type="ppi">
  <argument ref="e33"/>
  <argument ref="e34"/>
</relation>
<relation id="r15" conf="24.375326" norm="P00502885 - P00502885" type="ppi">
  <argument ref="e38"/>
  <argument ref="e39"/>
</relation>
</relations></text></document>
```

FIG. 8D

R1      R2
Glycogen synthase kinase3 beta phosphorylates serine 33 of p53 and activates p53's transcriptional activity BACKGROUND: The p53 protein is activated by genotoxic stress, oncogene expression and during senescence, p53 transcriptionally activates genes involved in growth arrest and apoptosis. p53 activation is regulated by post-translational modification, including phosphorylation of the N-terminal transactivation domain. Here, we have examined how Glycogen Synthase Kinase (GSK3), a protein kinase involved in tumorigenesis, differentiation and apoptosis, phosphorylates and regulates p53. RESULTS: The 2 isoforms of GSK3, GSK3alpha and GSK3beta, phosphorylate the sequence Ser-X-X-X-Ser(P) when the C-terminal serine residue is already phosphorylated. Several p53 kinases were examined for their ability to create GSK3 phosphorylation sites on the p53 protein. Our results demonstrate that phosphorylation of serine 37 of p53 by DNA-PK creates a site for GSK3beta phosphorylation at serine 33 in vitro. GSK3alpha did not phosphorylate p53 under any condition. GSK3beta increased the transcriptional activity of the p53 protein in vivo. Mutation of either serine 33 or serine 37 of p53 to alanine blocked the ability of GSK3beta to regulate p53 transcriptional activity. GSK3beta is therefore able to regulate p53 function in vivo. p53's transcriptional activity is commonly increased by DNA damage. However, GSK3beta kinase activity was inhibited in response to DNA damage, suggesting that GSK3beta regulation of p53 is not involved in the p53-DNA damage response. CONCLUSIONS: GSK3beta can regulate p53's transcriptional activity by phosphorylating serine 33. However, GSK3beta does not appear to be part of the p53-DNA damage response pathway. Instead, GSK3beta may provide the link between p53 and non-DNA damage mechanisms for p53 activation.

INFORMATION EXTRACTION APPARATUS AND METHODS

This application is the U.S. national phase of International Application No. PCT/GB2008/050933 filed 10 Oct. 2008, which designated the U.S. and claims priority to GB Application No. 0719842.7 filed 10 Oct. 2007, and GB Application No. 0803078.5 filed 20 Feb. 2008, the entire contents of each of which are hereby incorporated by reference.

FIELD OF THE INVENTION

The present invention relates to information extraction. In particular, the invention relates to apparatus and methods for automatically extracting information from digital representations of documents comprising or consisting of natural language text for presentation to a human curator for review.

BACKGROUND TO THE INVENTION

It has been proposed to use information extraction procedures to reduce human effort when preparing records for inclusion in a database. For example, co-pending International Patent Application No. PCT/GB2007/001170 discloses information extraction procedures which make use of a computer-user interface that facilitates the review by a human curator of automatically extracted data in the form of annotation data concerning entities and relations between entities, in digital representations of documents comprising natural language text. The digital representations of documents are displayed to a user with individual instances of automatically identified entities and relations highlighted at their location within the documents. The annotation data may be edited by a curator or selected annotation data may be used to pre-populate fields in a provisional record for review and editing by a curator.

US 2006/0053170 discloses a system for parsing and/or exporting one or more multi-relational ontologies by applying a set of export constraints to one or more master ontologies. This is an example of a system in which unstructured data sources are text mined and curated.

It has been found that the use of automated information extraction methods to extract provisional data which is presented to a human curator for review speeds up the process of creating databases of information relating to documents including natural language text. However, previous work has assumed that conventional information extraction procedures are suitable for this task without modification and that human curators respond to information in the same way. The present invention aims to provide improved information extraction procedures to facilitate the preparation of databases relating to information derived from natural language text.

The invention will be discussed further using examples taken from the field of analysing biomedical scientific literature, for illustrative purposes. However, the invention is applicable to the analysis of any other type of document which includes natural language text.

SUMMARY OF THE INVENTION

According to a first aspect of the present invention there is provided automatic information extraction apparatus for extracting data for review by a human curator from digital representations of documents comprising natural language text, the automatic information extraction apparatus having a plurality of selectable operating modes in which the automatic information extraction apparatus is operable to extract different data for review by a human curator, and the automatic information extraction apparatus being operable to extract data with different balances between precision and recall.

Surprisingly, different human curators have different preferences concerning the data which is extracted and presented to them for review and/or perform better with different selections of data. We propose that some curators prefer and/or perform better when they review extracted data from an information extraction procedure which favours recall over precision and that other curators prefer and/or perform better when they review data from an information extraction procedure which favours precision over recall.

This difference is particularly applicable when the automatic information extraction apparatus identifies instances of entities and/or relations referred to in an analysed digital representation of a document and curators review data concerning the identified instances of entities and/or relations using a computer-user interface which displays a digital representation of a documents with the identified entities and/or relations highlighted at their location within the document. An information extraction procedure which favours precision over recall will lead to fewer incorrect instances of entities and/or relations being highlighted than an information extraction procedure which favours recall over precision, but will omit more instances of entities and/or relations which should have been identified.

This may result from the different reading styles of different curators. Curators who skim read documents may, for example, prefer information extraction which favours recall over precision even if this leads to the introduction of errors which must be removed or ignored by the curator. Curators who read documents thoroughly may, for example, prefer information extraction which favours precision over recall as precise information extraction may speed up their review of the extracted data. This difference in preference may be greater when analysing digital representations of documents which are relatively large, for example having more than 1,000 words, where at least a substantial proportion of, and typically all of, the digital representation of a document is presented to a user with identified entities and/or relations highlighted throughout the presented part of the digital representation of a document.

By "selectable operating modes in which the automatic information extraction apparatus is operable to extract different data for review" we refer to selectable operating modes in which different combinations of data would be extracted from a large corpora of digital representations of documents comprising natural language text, although the automatic information extraction apparatus may in some cases select the same data from a particular digital representation of a document, or particular section of a digital representation of document, in two or more operating modes.

By "precision" we refer to the proportion of extracted data which is relevant to the curator's needs. By "recall" we refer to the proportion of data which is relevant to the curator's needs which is extracted. By "relevant to the curator's needs" we refer to data which a perfect curator would not amend upon review.

With this specification and the appended claims, an information extraction procedure is balanced between precision over recall if it is optimised to maximise the F1-score, being the harmonic mean of recall and precision, defined as:

$$F1 = 2 \times \text{precision} \times \text{recall} / (\text{precision} + \text{recall})$$

Otherwise, an information extraction procedure favours recall over precision or precision over recall as appropriate.

Typically, the information extraction procedure will have been optimised to perform with a predetermined weighting towards recall or precision, or optimised to maximise the F1-score and then modified to favour recall or precision.

Nevertheless, there may be other differences in the way in which information extraction apparatus functions to extract different data in different operating modes. For example, the information extraction apparatus may include different algorithms to force consistent extraction of data concerning entities represented by identical character strings within a document or may include an algorithms to force consistent extraction of data concerning entities represented by identical character strings within a document in a first operating mode, but not a second operating mode.

In order to implement a plurality of selectable operating modes, the automatic information extraction apparatus may comprise a plurality of alternative information extraction modules which are operable to cause different data to be extracted for review, for example alternative information extraction modules which are operable to extract data with a different balance between recall and precision. Alternative information extraction modules may comprise different computer program modules. Alternative information extraction modules may comprise the same computer program module but different data sets (e.g. different parameter data) which specify the functionality of the computer program module.

Typically, the automatic information extraction apparatus comprises a plurality of software modules which implement successive stages in an information extraction procedure. In this case, the alternative information extraction modules may be alternative modules for carrying out one or more individual stages in an information extraction procedure with at least some stages of the information extraction procedure being carried out by the same software modules in the plurality of selectable operating modes.

For example, the alternative information extraction modules may be alternative named entity recognition modules. Preferably, the alternative information extraction modules comprise the same software modules which implement a named entity recognition algorithm (for example, a Maximum Entropy Markov model named entity recognition algorithm) using different parameter data (e.g. a prior file) which determines the function of the named entity recognition algorithm.

For example, the alternative information extraction modules may comprise a first named entity recognition module optimised for F1 score and a second named entity recognition module optimised to favour precision over recall.

Alternative information extraction modules may be provided in respect of more than one stage of an information extraction procedure, wherein the alternative information extraction modules provided in respect of each of two or more stages of an information extraction procedure are each operable to extract different data for review by a human curator.

Nevertheless, the alternative information extraction modules may be alternative modules adapted to carry out other steps of an information extraction procedure, such as sentence boundary detection, tokenization, chunking, part-of-speech tagging, lemmatisation, term identification or relation extraction modules.

The automatic information extraction apparatus may extract different data for review by a human curator in each of the plurality of different operating modes only in respect of entities and/or relations of one or more specific types, or which have one or more specific properties. Alternative information extraction modules may be provided which are operable to carry out one or more stages of an information extraction procedure, such as term identification, differently in respect only of instances of entities and/or relations of one or more specific types, or which have one or more specific properties. For example, alternative information extraction modules may comprise term identification modules which identify entities and/or relations with different balances between precision and recall in respect of only some types of entity and/or relation. For example, alternative term identification modules may be provided which identify one or more types of entity (e.g. proteins) with different balances between precision and recall, but identify one or more other types of entities with the same balance between precision and recall. Alternative first and second term identification modules may be provided, the first term identification module being operable to identify a first type of entity and/or relation with a first balance between precision and recall, and a second type of entity and/or relation, respectively, with the same balance between precision and recall, the second term identification module being operable to identify the first and second types of entity and/or relation with different balances between precision and recall. For example, the second term identification module may identify proteins favouring precision over recall and tissues favouring recall over precision.

One skilled in the art will recognise that modules for carrying out one or more steps of an information extraction procedure, such as named entity recognition modules, may be customised to modify the balance between precision and recall in different ways appropriate to the module. For example, the modification of a named entity recognition module to vary the balance between precision and recall by tweaking an existing learned sequential classifier was disclosed in E. Minkov et al., (Proceedings of the Human Language Technology Conference of the North American Chapter of the ACL, pages 93-96, New York, June 2006).

Curators may perform better when reviewing data extracted in different information extraction modes for different groups of documents, (e.g. certain types of document, document concerning a certain subject, or batches of digital representations of documents selected according to specific search criteria). Accordingly, the information extraction apparatus may be operable to receive instructions as to the information extraction mode, selected from amongst the plurality of information extraction modes, which is to be used to extract data from a specific batch of digital representations of documents. Thus, an information extraction mode by selected for particular batches of digital representations of documents, such as batches of digital representations of documents relating to a specific topic, or which were retrieved according to a specific set of search criteria.

The automatic information extraction apparatus is typically operable to identify individual instances of entities in a digital representation of a document and may also extract additional data (such as properties) concerning the identified individual instances of entities. The automatic information extraction apparatus may be operable to ensure that each individual instance of a character string which is identified as an entity, or identified as a particular category of entity (e.g. a protein or gene in the case of analysis of biomedical documents) is consistently identified as the same entity within the same digital representation of a document. We have found that this may be preferred by some curators. Where identified entities are sub-cellular entities (e.g. proteins, genes and/or organelles), each individual instance of an entity with the same character string may be consistently identified as relating to the same species. The first instance of a character string may be identified as representing a particular entity whereupon all subsequent instances of the same character string in the digital representation of a document may be automatically identified as representing the same entity. Alternatively, for each character string which is identified as representing an entity at more than one location in a digital representation of a document, the information extraction apparatus may be operable to determine the entity which that character was most frequently identified as representing and to amend the identification of each mention of the character string to the most frequently identified entity.

Within the specification and the appended claims, the term "character string" includes sequences of letters, numbers and/or other punctuation symbols, and may optionally include letters, numbers and/or other punctuation symbols in more than one style, for example characters in superscript or subscript. The character strings typically comprise characters according to a recognised international character repertoire such as ASCII, 150646, or ISO/IEC 10646 (Unicode). When determining whether two character strings are identical, it may (or may not) be taken into account whether the style of each character in each character string is identical.

The automatic information extraction apparatus may be operable to receive data (such as an identifier, or stored preference or option) concerning the human curator who will review data extracted from a particular digital representation of a document, and to select an operating mode from amongst the plurality of operating modes for the extraction of data from that particular digital representation of a document.

The invention extends in a second aspect to information extraction and curation apparatus comprising automatic information extraction apparatus according to the first aspect of the invention and a curation computer-user interface which is operable to present extracted data to a human curator for review and possible amendment.

The information extraction and curation apparatus may be operable to analyse the interaction between one or more human curators and the curation computer-user interface in order to allocate an operating mode for subsequent information extraction by a particular human curator, or to modify an information extraction mode for subsequent information extraction, or to measure the performance of information extraction apparatus in a particular operating mode. The information extraction and curation apparatus may be operable to measure one or more metrics related to the speed of a curator, for example, the number of mouse clicks or key presses required to review and edit extracted data, the number of searches they carry out to find relevant data, the time taken to curate data or the rate of curation of data. The metric may be related to the number of searches the curator carries out using a search engine which is operable to find, edit or check extracted data, such as a search engine which is operable to search a database of information concerning entities (for example, sub-cellular entities such as proteins or genes) in order to ascertain an identifier of a character string in the digital representation of a document which represents an entity but has not been identified as an entity or has been misidentified as the wrong entity.

The curation computer-user interface may be operable to display a digital representation of a document to a user with identified entities and/or relations highlighted in the displayed digital representation of a document. In this case, different human curators may prefer, or perform better, when reviewing data extracted in information extraction modes which differ in terms of their balance between precision and recall dependent on their personal reading style.

The automatic information extraction apparatus and information extraction and curation apparatus are typically implemented in the form of one or more computers executing program code.

According to a third aspect of the present invention there is provided a method of extracting data for review by a human curator from digital representations of documents comprising natural language text, the method comprising providing automatic information extraction apparatus according to the first aspect of the present invention, or information extraction and curation apparatus according to the second aspect of the invention, selecting an operating mode from amongst the plurality of operating modes and causing the automatic information extraction apparatus to function in the selected operating mode to extract data for review by a human curator.

The operating mode may be selected dependent on the human curator, from a group of human curators, who is to review the extracted data. The automatic information extraction apparatus may carry out information extraction in a plurality of operating modes simultaneously or consecutively to extract data for review by a plurality of human curators. Accordingly, the automatic information extraction apparatus preferably carries out information extraction in a plurality of operating modes simultaneously or consecutively to extract data for review by a group of human curators, and then presents the resulting extracted data to individual human curators within a group of human curators for review and possible amendments, with some of the human curators in the group of human curators being presented with data extracted in a first information extraction mode and some human curators in the group of human curators being presented with data extracted in a second information extraction mode.

The automatic information extraction apparatus may carry out information extraction in a plurality of operating modes on the same digital representation of a document. A human curator may then be presented with an option as to which resulting extracted data they review.

The method may comprise receiving instructions as to the information extraction mode to be employed to extract data from a specific batch of digital representations of documents and to then extract data from the specified batch of digital representations of documents using the specific information extraction module.

According to a fourth aspect of the present invention there is provided a method of optimising automatic information extraction apparatus which is operable to extract data for review by a human curator from digital representations of documents comprising natural language text, comprising the steps of:

(i) extracting data from at least one digital representation of a document comprising natural language text, using an information extraction module;

(ii) providing a computer-user interface which presents the extracted data to a human curator for review and which analyses the interactions between the human curator and the computer-user interface; and (iii) modifying the information extraction module responsive to the analysed interactions to facilitate an improvement in the subsequent performance of a or the human curator using the information extraction module and computer-user interface to review extracted data, the information extraction module being modified so as to change the balance between precision and recall of the information extraction module.

The performance of the human curator may be considered to be improved if they require less time to review extracted data or review the extracted data more accurately. The analysis of the interactions between the human curator and the computer-user interface may comprise a measurement of one or more metric related to the speed of a curator, for example, the number of mouse clicks or key presses required to review and edit extracted data, the number of searches they carry out to find relevant data, the time taken to curate data or the rate of curation of data.

The information extraction module may be operable to identify entities and/or relations in a digital representation of a document and the computer-user interface may be operable to display at least a part of the digital representation of a document with identified entities and/or relations highlighted therein. The information extraction module may be operable to extract properties of entities and/or relations from digital representations of documents.

Preferably, the modification to the information extraction module comprises an optimisation. More preferably, the modification to the information extraction module changes the balance between precision and recall of the information extraction module by modifying parameter data which determines the performance of an algorithm (e.g. prior data which determines the performance of a named entity recognition algorithm) without modifying program code which, when executed on computing apparatus, causes the computing apparatus to perform the algorithm with reference to data which determines the performance of the algorithm. The modification may comprise altering parameters which affect decision boundaries concerning whether a named entity recognition module considers a particular token to constitute the beginning (tagged "B" in the BIO encoding approach) of a chunk representing an entity or is inside (tagged "I" in the BIO encoding approach) a chunk representing an entity, or is outside any chunk representing an entity (tagged "O" in the BIO encoding approach). For example, the modification may comprise modifying the prior belief of a Maximum Entropy Markov Model named entity tagger as to the likelihood of a token comprising the beginning of an entity, a subsequent part of an entity, or not being a part of an entity.

Although the embodiments of the invention described with reference to the drawings comprise methods performed by computer apparatus, and also computing apparatus, the invention also extends to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc or hard disc. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

BRIEF DESCRIPTION OF THE DRAWINGS

The invention will be further described, by way of example only, with reference to the following drawings in which:

FIG. 6 is an example text suitable for analysis by the system;

FIG. 7 is an XML file concerning the example text before information extraction;

FIGS. 8A, 8B, 8C and 8D constitute successive portions of an XML file concerning the example text after information extraction;

FIG. 9 is the text of FIG. 6 with identified entities underlined and identified relations labelled; and FIG. 10 is a schematic diagram of a curation computer-user interface.

DETAILED DESCRIPTION OF AN EXAMPLE EMBODIMENT

Figure 1:
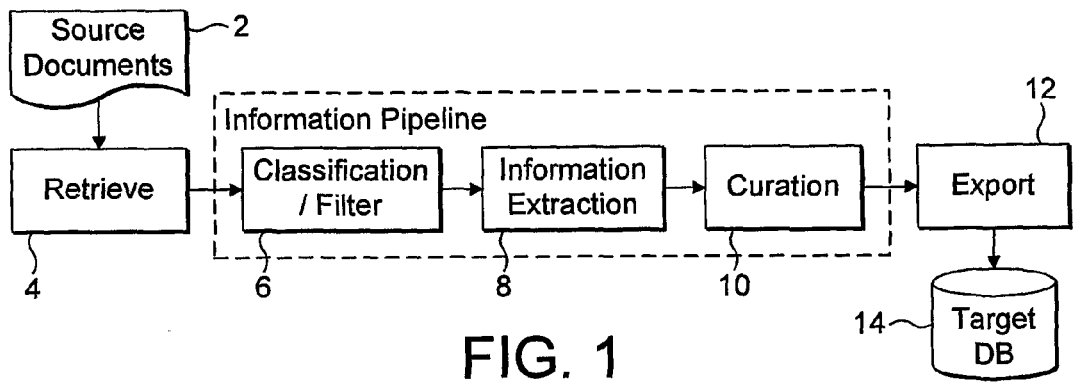
FIG. 1 is a schematic diagram of the main flow of information through a system according to the present invention.

By way of introduction, FIG. 1 is a schematic diagram of the main flow of information through an information extraction system according to the present invention. The example system extracts data from digital representations of biomedical text documents which include natural language text and presents the resulting extracted data to human curators for review. The example system is designed for the analysis of large number of digital representations of documents with extracted data being curated by a team of human curators.

Source documents 2 are retrieved 4 from a document source. The system analyses digital representations of documents and so the source documents will typically be digital representations of documents, for example, full text journal articles or Medline Abstracts, (Medline is a trade mark of the National Library of Medicine, Bethesda, Md.), although the documents may be retrieved in printed form and scanned. Document files (which constitute digital representations of documents) are then classified and filtered 6 before being subject to an information extraction procedure 8 using natural language processing (NLP) methods before being curated 10 by a human curator using a computer-user interface. Following the curation step, data is exported 12 to a target database 14. The flow of information through the system is discussed in more depth below.

Figure 2:
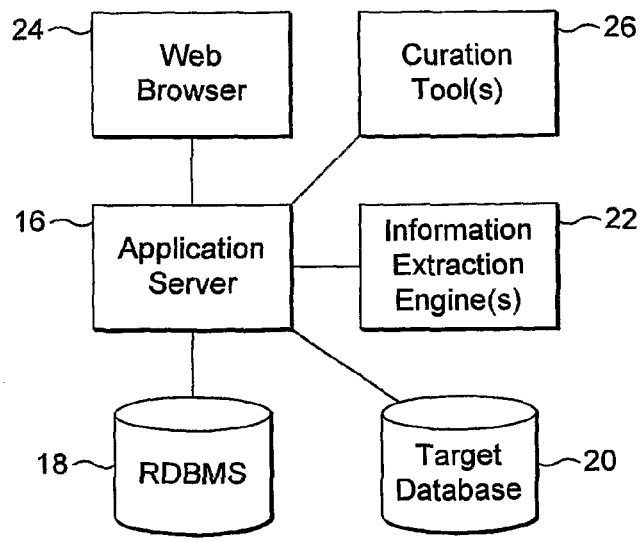
FIG. 2 is a schematic diagram of key components of the system.

FIG. 2 is a schematic diagram of key components of the system. Application logic running on an application server 16 controls the system via a set of core services running in a J2EE application server (J2EE is a trade mark of Sun Microsystems) using a Spring Framework container (The Spring Framework is an open source project described at www.springframework.org). Relevant data, such as document files (constituting digital representations of documents) is retrievably stored in the form of XML files by a relational database management system 18. Information extraction engine(s) 22 are implemented by a single processor or one or more processors operating in parallel. A web browser 24 provides administrative access to the system and control over the curation process. Curation tools 26 implement a computer-user interface on computers, each of which has a display, keyboard and a pointing device such as a mouse. Individual components can be connected through a network. The application server will typically communicate with web browsers and curation tools over SOAP and HTTP though an internet protocol network. One skilled in the art will recognise that several components of the system can be implemented on a single computer, or individual components may be implemented on a single computer or a cluster of computers.

Figure 3:
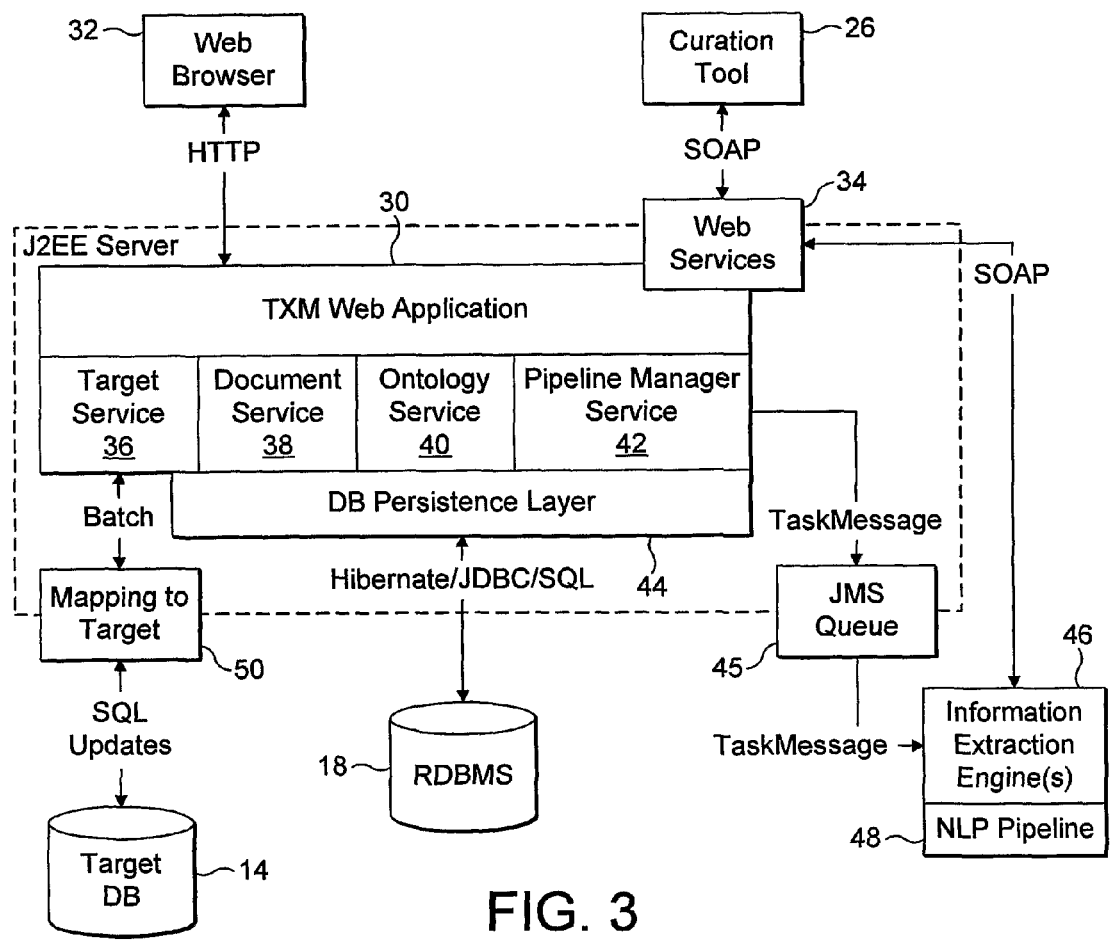
FIG. 3 is a schematic diagram of layers within the system architecture.

The software components which make up the system can be described in the form of layers, illustrated schematically in FIG. 3. Presentation logic is encapsulated in web application layer 30, allowing control of the system via a web browser 32. Web services components 34 communicate with one or more curation tools 26 delivered to web browsers as Java applications using Java Web Start. (Java and Java Web Start are trade marks of Sun Microsystems).

Key aspects of the application logic are encapsulated in four key services, namely a target service 36 which includes control logic relating to bidirectional communication with a target database 14, including logic relating to the export of output data for populating a target database; a document service 38 which serves as an API to collections of document files which have been gathered and stored, allowing other components of the system read/write access to the data in an abstracted and controlled fashion; an ontology service 40 which manages a persistent representation of the ontologies used within the system and also manages export of ontology data in a format suitable for use by the information extraction engine as well as import of ontology data from the target database; and a pipeline manager service 42 which comprises a web tier providing a computer-user interface adapted to allow the initiation and monitoring of curation jobs and a service layer which encapsulates the core functionality for handling curation jobs. A database persistence layer 44 provides control logic to allow data to be persisted uniformly to the relational database management system 18 using the Hibernate object/relational persistence and query service or customised SQL via JDBC (JDBC is a trade mark of Sun Microsystems, Inc. Hibernate is an open source project described at www.hibernate.org). Information extraction is decoupled via a JMS queue 45 and managed by information extraction engine 46 which interfaces with natural language processing (NLP) pipeline 48. Another important part of the system is a target mapping control module 50 which maps output data from the target service to a target database.

Document Retrieval

Figure 4:
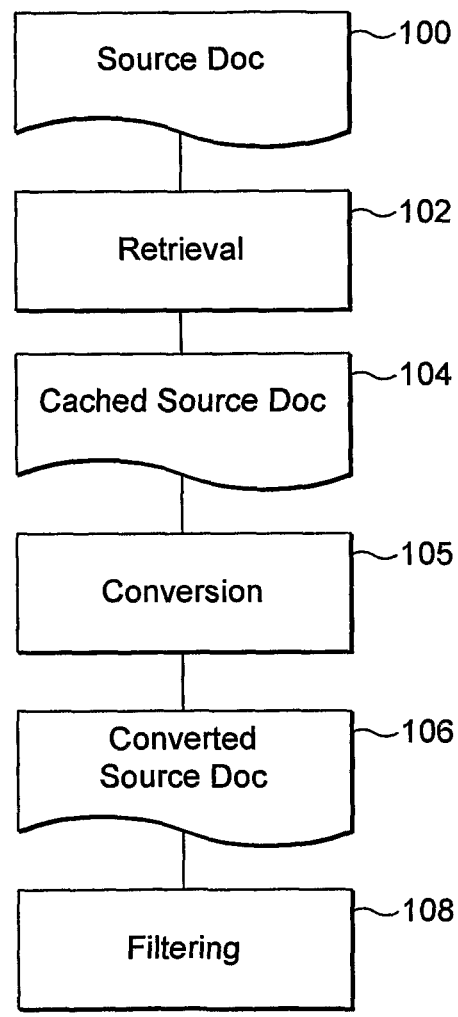
FIG. 4 is a flow diagram of the steps involved in retrieving documents files and filtering them prior to information extraction.

In use, document files are retrieved from external sources under the control of the pipeline manager service. FIG. 4 is a flow diagram of the steps involved in retrieving documents files and filtering them prior to information extraction. Document files 100 are retrieved 102 from one or more remote sources and cached 104. Document files may be received which fulfil a particular search query, or according to predetermined criteria. For example, documents fulfilling certain criteria may be automatically retrieved periodically from PubMed (www.ncbi.nlm.nih.gov/entrez/query.fcgi).

Document files are then converted 105 into a different format if need be. Document files are converted into XML files including plain text with no, or relatively little mark-up. A software module is provided for converting document files in portable document format (PDF) to XML. It is important that these document files are not XML marked-up files which have simply had the XML mark-up removed. This is because text obtained by removing mark-up from a marked up XML source will not always be the same as that obtained directly from an original plain text source. For example, an XML marked-up document might annotate a protein fragment using subscripts or superscripts to identify the particular fragment. For example, if the XML mark-up was removed from XML mark-up denoting text fragment $ABC^{12-37}$, the resulting plain text would be ABC12-37. However, the same document from an original plain text source may mark this up as ABC12-37 or ABC 12-37 or ABC(12-37) or ABC[12-37].

The converted document files are stored 106 and both the original retrieved document files and the converted document files are retained in storage. Document files (which have been converted if need be) are optionally filtered 108 to determine those of most relevance.

Information Extraction

Figure 5:
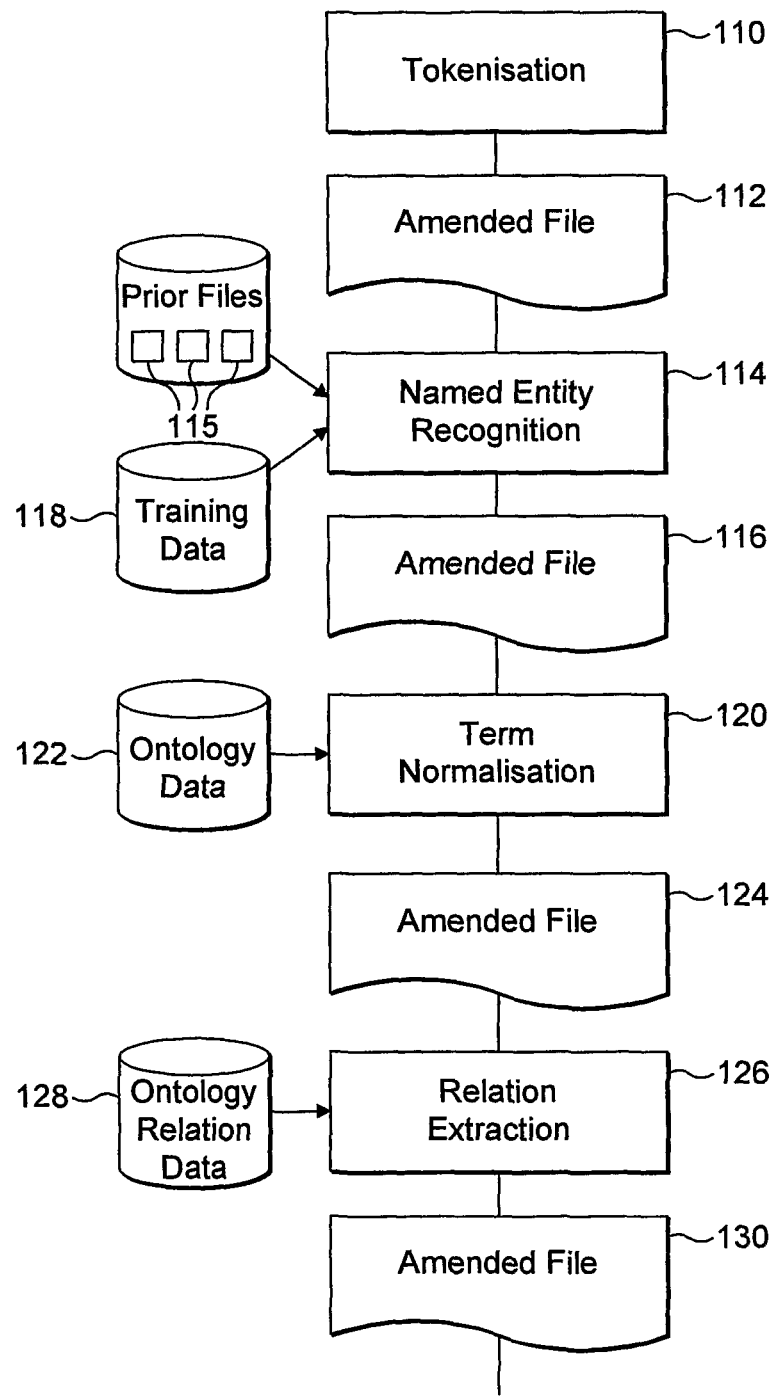
FIG. 5 is a flow diagram of the steps involved in information extraction.

FIG. 5 is a flow diagram of the steps involved in the subsequent information extraction procedure. A tokenisation software module 110 accepts a cached document file in XML format as input and outputs an amended XML file 112 including tokenisation mark-up. A named entity recognition software module 114 receives the amended XML file 112 as input and outputs a further amended XML file 116 in which individual instances of entities have been recognised and marked-up. The named entity recognition software module 114 has been previously trained on training data 118. The named entity recognition software module comprises a plurality of different prior files which function as data which determines the performance of the named entity recognition software module. Different prior files 115 which have been amended to provide different balances between precision and recall have been provided for use in extracting data for review by different curators. Training data 118 is described further below. The amended XML file 116 is then processed by a term normalisation software module 120 which also takes ontology data 122 as an input, outputting a further amended XML file 124 in which individual instances of entities have been labelled by reference to normalised forms of the entity stored in the ontology data. The amended XML file 124 is then processed by a relation extraction software module 126 which outputs an annotated XML file 128 including data concerning relations which have been identified in the document file.

Tokenisation, named entity recognition, term normalisation and relation extraction are each significant areas of ongoing research and software for carrying out each of these stages is well known to those skilled in the field of natural language processing. In an exemplary information extraction pipeline, input documents in a variety of formats, such as pdf and plain text, as well as XML formats such as the NCPI/NLM archiving and interchange DTD, are converted to a simple XML format which preserves some useful elements of a document structure and formatting information, such as information concerning superscripts and subscripts, which can be significant in the names of proteins and other biomedical entities. Documents are assumed to be divided into paragraphs, represented in XML by <p> elements. After tokenisation, using the default tokeniser from the LUCENE project (the Apache Software Foundation, Apache Lucene, 2005) and sentence boundary detection, the text in the paragraphs consists of <s> (sentence) elements containing <w> (word) elements. This format persists throughout the pipeline. Additional information and annotation data added during processing is generally recorded either by adding attributes to words (for example, part-of-speech tags) or by standoff mark-up. The standoff mark-up consists of elements pointing to other elements by means of ID and IDREF attributes. This allows overlapping parts of the text to be referred to, and standoff elements can refer to other standoff elements that are not necessarily contiguous in the original text. Named entities are represented by <ent> elements pointing to the start and end words of the entity. Relations are represented by a <relation> element with <argument> children pointing to the <ent> elements participating in the relation. The standoff mark-up is stored within the same file as the data, so that it can be easily passed through the pipeline as a unit, but one skilled in the art will recognise that the mark-up may be stored in other documents.

Input documents are then analysed in turn by a sequence of rule-based pre-processing steps implemented using the LT-TTT2 tools (Grover, C., Tobin, R. and Matthews, M., Tools to Address the Interdependence between Tokenisation and Standoff Annotation, in Proceedings of NLPXML2-2006 (Multi-dimensional Markup in Natural Language Processing), pages 19-26. Trento, Italy, 2006), with the output of each stage encoded in XML mark-up. An initial step of tokenisation and sentence-splitting is followed by part-of-speech tagging using the C&C part-of-speech tagger (Curran, J. R. and Clark, S., Investigating GIS and smoothing for maximum entropy taggers, in Proceedings of the 11th Meeting of the European Chapter of the Association for Computational Linguistics (EACL-03), pages 91-98, Budapest, Hungary, 2003), trained on the MedPost data (Smith, L., Rindflesch, T. and Wilbur, W. J., MedPost: a part-of-speech tagger for biomedical text. Bioinformatics, 20(14):2320-2321, 2004).

A lemmatiser module obtains information about the stems of inflected nouns and verbs using the Morpha lemmatiser (Minnen, G., Carroll, J. and Pearce, D., Robust, applied morphological generation, in Processing of 1st International Natural Language Generation Conference (NLG '2000), 2000). Information about abbreviations and their long forms (e.g. B cell linker protein (BLNK)) is computed in a step which calls Schwartz and Hearst's ExtractAbbrev program (Schwartz, A. S. and Hearst, M. A. Identifying abbreviation definitions in biomedical text, in Pacific Symposium on Biocomputing, pages 451-462, 2003). A lookup step uses ontology information to identify scientific and common English names of species for use downstream in the Term Identification component. A final step uses the LT-TTT2 rule-based chunker to mark up noun and verb groups and their heads (Grover, C. and Tobin, R., Rule-Based Chunking and Reusability, in Proceedings of the Fifth International Conference on Language Resources and Evaluation (LREC, 2006), Genoa, Italy, 2006.)

A named entity recognition module is used to recognise proteins, although one skilled in the art will recognise that other entities such as protein complexes, fragments, mutants and fusions, genes, methods, drug treatments, cell-lines etc. may also be recognized by analogous methods. The named entity recognition module was a modified version of a Maximum Entropy Markov Model (MEMM) tagger developed by Curran and Clark (Curran, J. R. and Clark, S., Language independent NER using a maximum entropy tagger, in Walter Daelemans and Miles Osborne, editors, Proceedings of CoNLL-2003, pages 164-167, Edmonton Canada, 2003, hereafter referred to as the C&C tagger) for the CoNLL-2003 shared task (Tiong Kim Sang, E. F. and De Mulder, F., Introduction to the CoNLL-2003 shared task: Language-independent named entity recognition, in Walter Daelemans and Miles Osborne, editors, Proceedings of CoNLL-2003, pages 142-147, Edmonton, Canada, 2003).

The vanilla C&C tagger is optimised for performance on newswire named entity recognition tasks such as CoNLL-2003, and so a tagger which has been modified to improve its performance on the protein recognition task is used. Extra features specially designed for biomedical text are included, a gazetteer containing possible protein names is incorporated, an abbreviation retagger ensures consistency with abbreviations, and the parameters of the statistical model have been optimised. The addition features which have been added using the C&C experimental feature option are as follows: CHARACTER: A collection of regular expressions matching typical protein names; WORDSHAPE: An extended version of the C&C 'wordtype' orthographic feature; HEADWORD: The head word of the current noun phrase; ABBREVIATION: Matches any term which is identified as an abbreviation of a gazetteer term in this document; TITLE: Any term which is seen in a noun phrase in the document title; WORDCOUNTER: Matches any non-stop word which is among the ten most commonly occurring in the document; VERB: Verb lemma information added to each noun phrase token in the sentence; FONT: Text in italics and subscript contained in the original document format. NOLAST: The last (memory) feature of the C&C tagger was removed. The modified C&C tagger has also been extended using a gazetteer in the form of a list of proteins derived from RefSeq (http://www.ncbi.nlm.nih.gov/RefSeq/), which was pre-processed to remove common English words and tokenised to match the tokenisation imposed by the pipeline. The gazetteer is used to tag the proteins in the document and then to add the bio tag corresponding to this tagging and the bigram of the previous and current such bio tags as C&C experimental features to each word. Cascading is carried out on groups of entities (e.g. one model for all entities, one for specific entity type, and combinations). Subsequent models in the cascade have access to the guesses of previous ones via a GUESS feature. The C&C tagger corresponds to that described in B. Alex, B. Haddow, and C. Grover, Recognising nested named entities in biomedical text, in Proceedings of BioNLP 2007, p. 65-72, Prague, 2007, the contents of which are incorporated herein by virtue of this reference.

In use, the C&C tagger employs a prior file which defines parameters which affect the function of the tagger. A plurality of different prior files are provided to enable named entity recognition to be carried out with different balances between precision and recall, thereby enabling information extraction to take place in a plurality of different operating modes in which different data is extracted for subsequent review by the human creator. The "tag prior" parameter in each prior file is selected in order to adjust the entity decision threshold in connection with each of the bio tags and thus modify the decision boundary either to favour precision over recall or recall over precision.

The abbreviation retagger is implemented as a post-processing step, in which the output of the C&C tagger was retagged to ensure that it was consistent with the abbreviations predicted by the Schwarz and Hearst abbreviation identifier. If the antecedent of an abbreviation is tagged as a protein, then all subsequent occurrences of the abbreviation in the same document are tagged as proteins by the retagger.

A species tagger which has been trained on manually species-tagged annotated data is used in order to provide a term identification module which is able to disambiguate between species. The term identification module applies the following three steps to every protein mention until all protein mentions in a document are assigned an entity identifier. Firstly, candidate identifiers are assigned to each protein mention by performing an approximate search in an ontology which comprises synonyms of proteins and which has previously been expanded by inserting orthographic variants of the protein entries into the ontology, where the orthographic variants include the strings obtained by removing/adding spaces or hyphens between strings (e.g. "TEG 27"=>"TEG27"), replacing the space between strings with a hyphen (e.g. "TEG 27"=>"TEG-27"), etc. The approximate search generates variants of protein mentions according to rules, such as lowercasing the protein mention, substituting the term with abbreviation/long form partners, removing the protein mention's species indicating prefix (e.g. "hTAK1"=>"TAK1")

and searching for the variant strings in the ontology. If a single candidate identifier is returned, the protein mention is monosemous and is assigned the single candidate identifier.

Otherwise, in a second step, the most likely species of the individual protein mention is identified using a species tagger trained on manually annotated data. The species tagger is a weka implementation of the Support Vector Machines algorithm (www.cs.waikato.ac.nz/ml/weka, Witten, I. H. and Frank, E. (2005), Data Mining: Practical machine learning tools and techniques, second edition, Morgan Kaufmann, San Francisco, 2005). Each training instance has been represented as a features-value pair, where features were TF-IDF weighted word lemmas that co-occur with the protein mention in a context window of size 50, and a value is the species which has been assigned to the protein mention by a human annotator. Candidate identifiers of proteins which do not match the species assigned to the protein mention are discarded. If only a single candidate identifier is left, it is assigned to the protein mention.

Otherwise, in a third step, a heuristic rule is applied to rank the remaining candidate identifiers and the top-ranked identifier is assigned to the individual protein mention. The heuristic rule favours identifiers which have the lowest numerical value. We have found that this improves term identification when the identifier is the accession number of a protein in the Cognia Molecular database and would anticipate the corresponding result if the identification was the accession number of the protein in RefSeq, as Cognia Molecular was initially derived from an earlier version of RefSeq.

After term identification, a relation extraction module uses simple contextual features to detect binary relations between proteins (Protein-Protein Interactions) in the digital representations of documents. For every pairing of proteins within a sentence, a relation candidate is created and its relevant features extracted. Probabilities are assigned to each instance using a Maximum Entropy Classifier (available from homepages.inf.ed.ac.uk/s0450736/maxent_toolkit.html), and those instances with probabilities which exceeded a threshold are accepted as relations. The features used are: the combination of the indeces of the protein mentions of the interaction "P1-position:P2-position"; the combination of the lexical forms of the protein mentions of the interaction "P1:P2"; the lexical form, stemming/lemmatisation, part-of-speech tag and chunking information in a three-word context around the protein mentions; the distance, in tokens, between the two protein mentions; the number of other identified protein mentions between the two protein mentions; whether there is a coordination of negation structure between protein mentions; whether the document is an abstract or full paper; normalised forms of the protein mentions; concatenation of the words between proteins, and another features using the part-of-speech tags in the same manner; words between and right before/after proteins in a bag-of-words approach; bigrams and trigrams around protein mentions. The relation extraction module also uses the following information: a protein/gene interaction corpus derived from the BioCreAtIvE task 1A data, as additional training data (described in Plake, C., Hakenberg, J. and Leser, U., Optimizing syntax-patterns for discovering protein-protein-interactions, in Proc ACM Symposium on Applied Computing, SAC, Bioinformatics Track, volume 1, pages 195-201, Santa Fe, USA, March 2005); a list of "interaction words" which have been determined to be information of when a protein-protein interactions occurs, such as interact, bind, inhibit, phosphorylation, were used for some features; the twenty-two syntactic patterns used in Plake et al., are each used as boolean features in regular expression form: "P1 word {0,n} Iverb word {0,m} P2". All of the following features are extracted for the nearest interaction words found before, between and after each pair of protein mentions: whether an interaction word exists within a window of fifteen tokens; the distance between the interaction word and the protein it is closest to; the lexical form and part-of-speech tag of the interaction word; whether the interaction word is a Head Verb or Noun; and how many interactions words there are in the sentence.

Example Document

FIG. 6 is an example of a document suitable for processing by the system. FIG. 7 is an XML file of the same document included within the title and body tags of an XML file suitable for processing by the system. The body of the text is provided in plain text format within body tags. FIGS. 8A, 8B, 8C and 8D are successive portions of an annotated XML file concerning the example document after information extraction by the procedure described above.

The annotated XML file includes tags concerning instances of entities 200 (constituting annotation entity data). Each tag specifies a reference number for the instance of an entity (e.g. ent id="e4"), the type of the entity (e.g. type="protein"), the confidence of the term normalisation as a percentage (e.g. conf="100") and a reference to ontology data concerning that entity, in the form of a URI (e.g. norm=http://www.cognia.com/txm/biomedical/#protein_P00502885). (The reference to ontology data concerning that entity constitutes an identifier of an instance of an entity which is a reference to ontology data). Tags concerning each instance of an entity are included inline within the XML file just before the word (with a <w> prefix and </w> suffix) to which the data relates (thereby constituting data which specifies the location of the identified instance of the entity within the digital representation of the document).

The annotated XML file also includes a document identifier 202, as well as data specifying the source of the document which the document file represents 204 and information concerning the parameters of the search carried out to retrieve the original document file 206.

Relations which have been identified in the text are recorded as standoff annotation at the end of the annotated XML file (FIGS. 8C and 8D). Annotation data concerning an instance of a relation 220 (constituting annotation relation data) includes a reference number 222 for that instance of a relation, the confidence 224 of the relation extraction as a percentage, normalised form of the entities which the relation concerns 226, the type of the entity 228 (e.g. type="ppi" denotes a protein-protein interaction), and the reference numbers 230, 232 of the entities which the relation concerns.

FIG. 9 is the document of FIG. 6 with the entities annotated in the XML file of FIGS. 8A to 8D underlined and the relations annotated in the XML file of FIGS. 8A to 8D indicated. Note that although the information extraction procedure has produced generally reliable results, there are errors. In particular, relation R6 is wrong and a further relation 250 has not been identified.

Following information extraction, the annotated XML file is stored in the relational database management system. At a later stage, the annotated XML file is curated via a curation tool computer-user interface, allowing a human curator to add, delete and amend annotation data. For example, in the case of the annotated document shown in FIG. 9, a human curator may delete or correct relation R6 and manually add further relation 250. As well as allowing a human curator to add, delete and amend curation data, the curation tool computer-user interface also allows the human curator to select data for output to a target database.

Curation

The curation tool computer-user interface is implemented by the web service component delivering a Java application to a computer which executes the application, as well as the annotated XML file relating to the document to be curated. A user interacts with the interface via the computer's monitor and input peripherals such as a keyboard and computer mouse.

Figure 10:
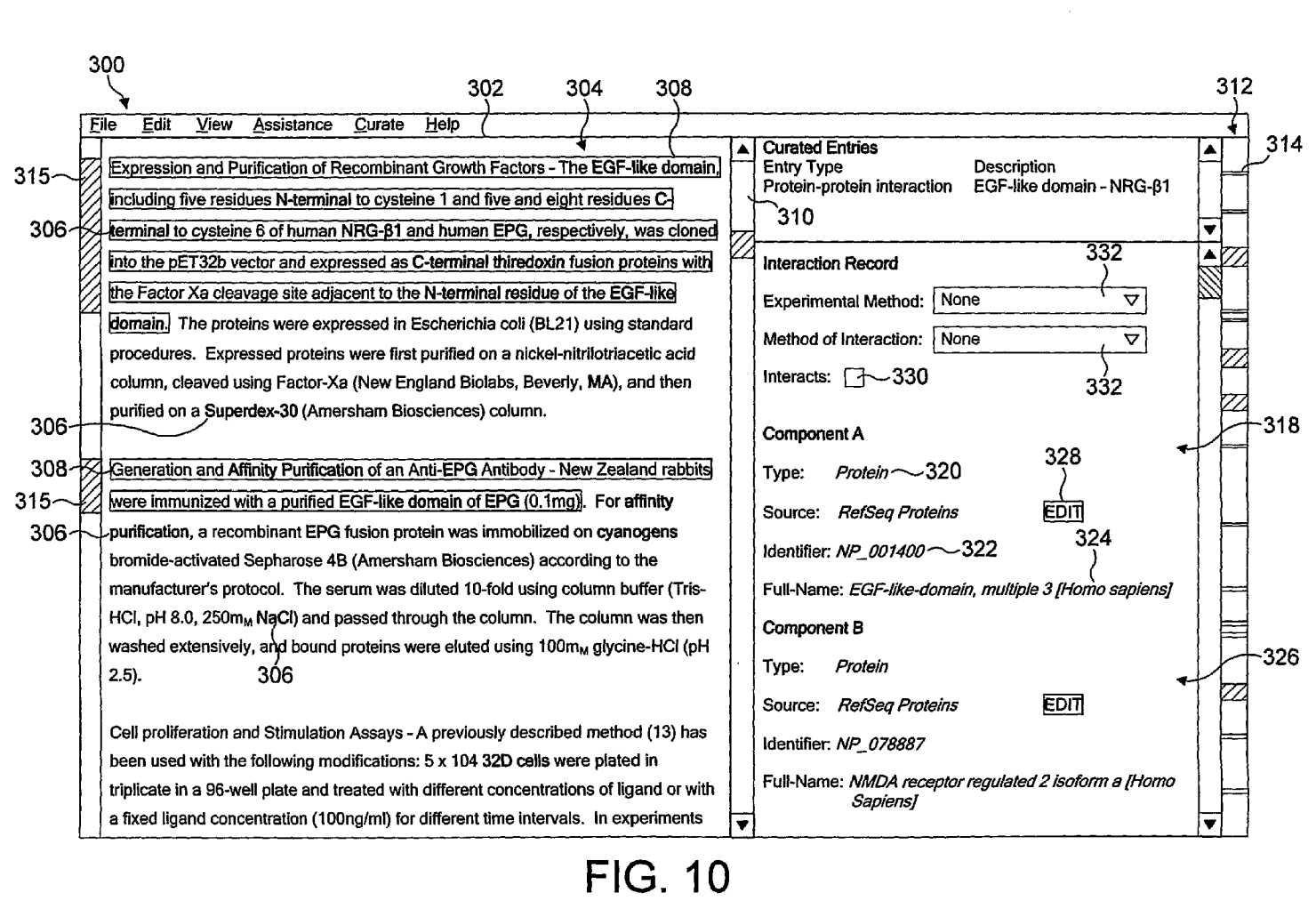

FIG. 10 is a screenshot of a curation computer-user interface 300. The computer-user interface displays a document display window 302 showing a document 304. Individual instances of entities 306 are highlighted at the location in the document which is specified by the annotation data (i.e. by the location of the tag concerning that instance of an entity within the XML file). In this example, each instance of an entity is highlighted by rendering it in bold. Not all instances of entities have been labelled, for clarity. Entities may be highlighted only in response to a request by a user (e.g. by selecting a menu option), or may be highlighted at all times. Accordingly, a part of the document which is visible within the document display window includes annotations (bold text) to highlight entities which were identified by the natural language processing pipeline. Within the document display window, relations 308 are annotated by highlighting them with a box around the text which describes the relation. The box may, for example, be in colour. The document display window further comprises a standard window scroll bar 310 enabling a user to scroll through the document.

The curation computer-user interface further includes a navigation tool in the form of a first elongate bar 312 which indicates features of the document which have been automatically identified by representing them with a colour bar 314 or other visual indicator at a position in the elongate bar which is proportional to their location within the document. Different types of features, such as protein mentions or other named entities, identified relations, or automatically identified section headings (such as "Introduction", "Materials and Methods" etc.) are displayed using different coloured bars or visual indicators. A second elongate bar 314 is an expanded representation of the features indicated in the first elongate bar which are visible in the section of the document which is currently displayed in the document display window. For example, a coloured bar 315 is provided alongside each identified relation. The second elongate bar is dynamically updated when the section of the document which is displayed is changed using the scrolls bar or other computer-user interface feature. The annotations representing entities and relations at their identified location within the document facilitate easy identification of relevant sections of the document, which require detailed study, by the curator.

The user-interface also provides means for a user to select a relation which has been automatically identified using a pointing device, such as a mouse, or another computer-user interface feature responsive to which provisional amended annotation data is prepared from the automatically identified annotation data concerning the selected relation. The provisional amended annotation data is then represented in an annotation amendment window 316. The annotation amendment window comprises a first section 318 which represents data concerning the entity which is the first component of a relation, including details of the type of entity 320 (e.g. protein), and the identifier 322 of the entity which was automatically identified during the natural language information extraction procedure. A canonical form of the name of the entity 324, obtained from the ontology, is also displayed. Corresponding information is provided in a second section 326 of the annotation amendment window in connection with the second entity which the relation concerns.

A curator may accept the provisional amended annotation data as correctly representing the relation and indicate using a user-interface feature (such as a button or menu choice) that the provisional amended annotation data is correct and should be used to create output data for export to a target database. However, the curator may also amend the provisional amended annotation data, for example they may select a user-interface feature such as a button 328 which enables them to edit the data concerning one or both of the identified entities using common user-interface features such as check boxes 330, text boxes, drop-down menus 332, lists etc. Thus, the curator may correct erroneous annotation data, for example an incorrect identification of an entity, or add annotation data which was omitted by the information extraction procedure (for example, an omitted entity). Added annotation data may include data which the information extraction procedure is not capable of extracting. For example, where the information extraction procedure is capable of identifying an entity, but not capable of identifying a property of the entity, this data can be input by a user, thereby obtaining an efficiency benefit from the user of an information extraction procedure, without the disadvantage of being able only to output data derived from the information extraction procedure. A curator may also create an entirely new provisional amended annotation data record. For example, they may create provisional amended annotation data concerning a relation which was not identified by the information extraction procedure, and then edit the provisional amended annotation data.

Examples of annotation data concerning entities which may be viewed and/or edited include the type of entity, the identifier of the entity, the canonical form of the entity, properties of the entity (e.g. whether and how it is modified). Examples of relation data concerning relations which may be viewed and/or edited include the identifiers of the entities which the relation concerns, a description of the relation and properties of the relation, e.g. the experimental method which lead to the relation (e.g. affinity purification), the method of interaction (e.g. phosphorylation) and whether the relation concerns an interaction.

Once the provisional annotation data concerning an entity (provisional annotation entity data) or a relation (provisional annotation relation data) has been edited, the resulting data is considered to be curated (i.e. approved by a curator) and stored for export to a target database, in whole or in part, as output data. Essentially, one or more records which constitute provisional annotation data have been pre-populated using annotation data which was prepared by the information extraction procedure, and then edited before being selected for export to a target database.

An example of the annotation relation data which could be stored for export is as follows:

"Between character offset 100 and character offset 200 of Document ID 123 which is from the "Medline Abstract" collection and has PubMed ID 456, 'p19' (protein p19, ontology ID 135) and 'ADP ribosylation factor' (protein Arf, ontology ID 680) are said to interact."

Thus, the annotation relation data may include a reference to the start and end locations of a fragment of text which refers to a particular relation ('character offset 100' and 'character offset 200'), as well as document identifiers (including internal document identifier, 'Document ID 123', and corresponding external document identifier, 'PubMed ID 456') and an identifier of the source ("Medline Abstract" collection) of the documents, as well as both the text denoting the related entities both as it is found in the document ('p19', 'ADP ribosylation factor) and in its normalised form ('p19' and 'Arf'). The annotation relation data can also include the type of the entities ('protein') and their IDs within ontology data ('ontology ID 680' and 'ontology ID 135') as well as details of the nature of the relation ('are said to interact').

One skilled in the art will recognise that the above annotation relation data could be stored in many different ways. Some or all of the annotation relation data may be exported to the target database.

In the above example, the annotation data in the input XML file is not amended. In an alternative embodiment, rather than editing provisional annotation data to form amended annotation data which is separate to the XML file concerning the edited document, the annotation data in the XML file, which was originally generated by the information extraction procedure, is amended. For example, where the document is received in the form of an XML file including annotation data, the curating procedure may finish by outputting an XML file including amended annotation data. In some circumstances, this would not be desirable because additional processing would be required to edit an XML file to reflected changes in annotation data in comparison to simply outputting curated provisional annotation data without the additional computing step of amending the annotation data included in an XML file. However, it may be advantageous to amend the underlying annotation data in certain circumstances, particularly when using the system to prepare training data for use in training a machine learning-based information extraction module.

Optionally, a local copy in system memory of annotation data in or relating to the input XML file may be amended during the editing procedure and used to dynamically update the display of the document with annotations.

Export

Periodically, the target service exports curated data to the target database. The target service proceeds systematically through the data to be exported in turn, checking whether the data is already found within the target database. If it is not, then the data is inserted into the target database by calling the API of the target database or generating an SQL insert/update. It may be necessary to translate the data into an appropriate format for the target database. If the target database has different ontology data, it is necessary to translate these references. The procedure can be repeated or carried out concurrently to populate more than one target database.

Customisation

In use, the information extraction procedure functions according to one of a plurality of operating modes by carrying out named entity recognition using a selected prior file from amongst the prior files which are available. The named entity recognition software and a particular prior file together function as an information extraction module selected from a group of selectable alternative information extraction modules.

The prior files used by the named entity recognition module have been individually selected to display different balances between precision and recall by manually modifying the prior belief of the named entity tagger as to the likelihood of a token comprising the beginning of an entity, a subsequent part of an entity, or not being a part of an entity. This enables different curators within a group of curators to review different sets of data, for example some curators may review data extracted using an information extraction procedure which favours precision and other curators may review data extracted using an information extraction procedure which favours recall over precision. Alternatively, or as well, a group of curators may all review data which has been extracted using an information extraction procedure which favours precision over recall, or an information extraction procedure which favours recall over precision. However, different curators within the group may review data which favours precision over recall, or recall over precision respectively, to different extents. Thus, data may be extracted from many digital representations of documents using at least two information extraction operating modes, typically having different balances between precision and recall, and individual members of a team of human curators may review data extracted in different information extraction operating modes.

Information extraction can be carried out in the appropriate operating mode for a particular curator who will be reviewing the extracted data, or for a group of curators who are known to prefer a particular operating mode. In some embodiments, information extraction is carried out on the same document in two or more operating modes and a choice is subsequently made as to which set of extracted data is to be presented to a particular curator.

Although in this example, only the named entity recognition module has different operating modes with different balances between precision and recall, any stage of the information extraction pipeline, or combination of stages of the information extraction pipeline, can be optimised to a different balance between precision and recall. Conceivably, some of the stages of the information extraction procedure could be optimised to favour precision over recall and some of the stage of the information extraction procedure could be optimised to favour recall over precision.

Feedback

A suitable metric which is representative of the performance of a curator can be monitored in order to optimise the information extraction pipeline, either for that particular curator or in general. This can be used to try out alternative modules which implement individual stages of the information extraction pipeline or to optimise modules which implement individual stages of the information extraction pipeline.

Examples of suitable metrics include the time taken by a curator to review specified data, the rate of curation by a curator, the rate of error made by a curator relative to a gold standard, the number of mouse clicks or key presses made by a curator which reviewing specified data or the number of uses made by a curator of a search engine which is operable by the curator to retrieve data they might need while introducing or amending omitted or incorrectly extracted data during curation.

For example, a suitable metric may be a measurement related to the number of times that a curator uses a search engine. A curator may use a search engine when the automatic information extraction apparatus has not identifier, or has misidentified, an instance of a mention of an entity in a digital representation of a document. The search engine may be operable search in the RefSeq or MeSH lexicons.

These metrics can also be used to determine which information extraction operating mode leads to the best performance by an individual curator.

Consistency

The information extraction pipeline extracts data concerning individual mentions of entities, and allocates them an identifier, from the context of each individual mention of an entity. This has the effect that different instances of entities denoted by a particular character string may be allocated different identifiers at different locations in a digital representation of a document. Sometimes this will be correct, but this is not always the case.

In an alternative embodiment, the named entity recognition module is modified to force all chunks comprising having the same character string to be allocated the same entity type (e.g. protein, gene). One method of forcing all chunks with the same character string to be allocated the same entity type is, for each character string which is identified as representing an entity of a particular type, to propagate the same type to each chunk in the document having the same character string. Digital representations of documents are typically analysed from beginning to end and so the identifier allocated to the first instance of a character string will thereby be allocated to all subsequent instances of the same character string. A second method of forcing all named entities with the same character string to be allocated the same identifier is to carry out named entity recognition on the digital representation of the document and, for every character string which is recognized as a named entity on more than one occasion, to allocate each instance of that character string the identifier of the most frequently allocated identifier of that character string in the initial named entity recognition step. Different methods of forcing consistent interpretation of identical character strings may be implemented in different information extraction operating modes.

Documents which are cited above are incorporated herein by virtue of this reference.

Further modifications and variations may be made within the scope of the invention herein disclosed.

The invention claimed is:

1. A non-transitory information extraction computing apparatus including at least one processor with accessible input/output and at least one data store, said at least one processor being programmed for extracting data for review by a human curator from digital representations of documents comprising natural language text, the information extraction computing apparatus, in use, executing computer program instructions that cause the apparatus to provide a plurality of selectable operating modes in which the automatic information extraction apparatus extracts different data for review by a human curator, and, in at least two of the plurality of selectable operating modes, to extract data with different balances between precision and recall, whereby a balance that favours precision over recall will lead to fewer incorrect instances of data being extracted than a balance that favours recall over precision, but will omit more data which should have been extracted.

2. Automatic information extraction apparatus according to claim 1, wherein the automatic information extraction apparatus comprises a plurality of alternative information extraction modules which are operable to cause different data to be extracted for review.

3. Automatic information extraction apparatus according to claim 2, wherein alternative information extraction modules comprise the same computer program module but different parameter data which specifies the functionality of the computer program module.

4. Automatic information extraction apparatus according to claim 2, wherein the alternative information extraction modules are named entity recognition modules.

5. Automatic information extraction apparatus according to claim 4, wherein the alternative named entity recognition modules comprise the same software modules which implements a named entity recognition algorithm and different parameter data which determines the function of the named entity recognition algorithm.

6. Automatic information extraction apparatus according to claim 1, wherein the automatic information extraction apparatus is operable to identify individual instances of entities in a digital representation of a document.

7. Automatic information extraction apparatus according to claim 6, wherein the automatic information extraction apparatus is operable to ensure that each individual instance of a character string which is identified as an entity is consistently identified as the same entity within the same digital representation of a document.

8. Automatic information extraction apparatus according to claim 6, wherein the automatic information extraction apparatus is operable to ensure that each individual instance of a character string which is identified as a particular type of entity is consistently identified as the same type of entity, respectively, within the same digital representation of a document.

9. Automatic information extraction apparatus according to claim 1, which is operable to apply different algorithms to force consistent extraction of data concerning entities represented by identical character strings within a document in two different information extraction modes.

10. Automatic information extraction apparatus according to claim 1, wherein the automatic information extraction apparatus is operable to receive data concerning the human curator who will review data extracted from a particular digital representation of a document, or preferences associated with the human curator who will review the data extracted from a particular digital representation of a document, and to select an operating mode from amongst the plurality of operating modes for the extraction of data from that particular digital representation of a document.

11. Information extraction and curation apparatus comprising automatic information extraction apparatus according to claim 1 and a curation computer-user interface which is operable to present extracted data to a human curator for review and possible amendment.

12. Information extraction and curation apparatus according to claim 11, operable to analyse the interaction between one or more human curators and the curation computer-user interface in order to allocate an operating mode for subsequent information extraction by a particular human curator, or to modify an information extraction mode for subsequent information extraction, or to measure the performance of an information extraction mode.

13. Information extraction and curation apparatus according to claim 11, operable to measure one or more metrics related to the speed of a curator.

14. Information extraction and curation apparatus according to claim 11, wherein the curation computer-user interface is operable to display a digital representation of a document to a user with identified entities and/or relations highlighted in the display digital representation of a document.

15. A method of extracting data for review by a human curator from digital representations of documents comprising natural language text, comprising providing automatic information extraction apparatus according to claim 1 or information extraction and curation apparatus, selecting an operating mode from amongst the plurality of operating modes and causing the automatic information extraction apparatus to function in the selected operating mode to extract data for review by a human curator.

16. A method of extracting data according to claim 15, wherein the operating mode is selected dependent on the human curator, from a group of human curators, who is to review the extracted data.

17. A method of extracting data according to claim 16, comprising carrying out information extraction in a plurality of operating modes to extract data for review by a plurality of human curators.

18. A method of extraction data according to claim 15, comprising receiving instructions as to the information extraction mode to be employed to extract data from a specific batch of digital representations of documents and then extracting data from the specified batch of digital representations of documents using the specific information extraction module.

19. A non-transitory computer readable carrier tangibly embodying computer program instructions which, when executed by a computing apparatus, cause the computing apparatus to carry out a method of optimising an automatic information extraction apparatus that extracts data for review by a human curator from digital representations of documents comprising natural language text, the method comprising the steps of:
   (i) extracting data from at least one digital representation of a document comprising natural language text, using an information extraction module;
   (ii) providing a computer-user interface which presents the extracted data to a human curator for review and which analyses the interactions between the human curator and the computer-user interface; and
   (iii) modifying the information extraction module responsive to the analysed interactions to facilitate an improvement in the subsequent performance of a or the human curator using the information extraction module and computer-user interface to review extracted data, the information extraction module being modified so as to change the balance between precision and recall of the information extraction module, whereby a balance that favours precision over recall will lead to fewer incorrect instances of data being extracted than a balance that favours recall over precision, but will omit more data which should have been extracted.

20. A computer readable carrier according to claim 19, wherein the analysis of the interactions between the human curator and the computer-user interface comprises measuring one or more metrics related to the speed of a curator.

21. A computer readable carrier according to claim 19, wherein the analysis of the interactions between the human curator and the computer-user interface comprises measuring a metric related to the number of searches made by a curator using a search engine which is operable to find, edit or check extracted data.

22. A computer readable carrier according to claim 19, wherein the information extraction module is operable to identify entities and/or relations in a digital representation of a document and the computer-user interface is operable to display at least a part of the digital representation of a document with identified entities and/or relations highlighted therein.

23. A computer readable carrier according to claim 19, wherein the modification to the information extraction module is an optimisation.

24. A computer readable carrier storing computer program instructions which, when executed on computing apparatus, cause the computing apparatus to function as the automatic information extraction apparatus of claim 1, or the information extraction and curation apparatus, or which cause the computing apparatus to carry out the methods.

* * * * *